(12) United States Patent
McCloy

(10) Patent No.: US 9,194,485 B2
(45) Date of Patent: Nov. 24, 2015

(54) SHIFT SYSTEM FOR POWER TRANSFER UNIT HAVING DUAL SECTOR SHIFT ACTUATOR

(75) Inventor: Chad McCloy, Cortland, NY (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 385 days.

(21) Appl. No.: 13/703,712

(22) PCT Filed: Jul. 13, 2011

(86) PCT No.: PCT/US2011/043802
§ 371 (c)(1),
(2), (4) Date: Jun. 6, 2013

(87) PCT Pub. No.: WO2012/009401
PCT Pub. Date: Jan. 19, 2012

(65) Prior Publication Data
US 2013/0263684 A1   Oct. 10, 2013

Related U.S. Application Data

(60) Provisional application No. 61/364,114, filed on Jul. 14, 2010.

(51) Int. Cl.
*F16H 59/04* (2006.01)
*B60K 17/344* (2006.01)
*F16H 63/30* (2006.01)
*B60K 23/08* (2006.01)

(52) U.S. Cl.
CPC .............. *F16H 59/04* (2013.01); *B60K 17/344* (2013.01); *F16H 63/304* (2013.01); *B60K 2023/0858* (2013.01); *F16H 59/041* (2013.01); *F16H 59/044* (2013.01); *F16H 2063/3056* (2013.01); *F16H 2063/3076* (2013.01); *F16H 2063/3089* (2013.01); *Y10T 74/20177* (2015.01)

(58) Field of Classification Search
CPC ..... F16H 59/04; F16H 59/041; F16H 59/044; F16H 63/304; F16H 2063/3089; F16H 2063/3056; F16H 2063/3076; B60K 17/344; B60K 2023/0858; Y10T 74/20177
USPC ............. 74/335, 337.5, 409, 440, 445, 473.1, 74/473.12, 473.19, 473.21, 473.25, 74/473.26, 473.28, 473.3, 473.36, 473.37
See application file for complete search history.

(56) References Cited

U.S. PATENT DOCUMENTS

| 2,784,608 | A |   | 3/1957  | Jozif     |          |
|-----------|---|---|---------|-----------|----------|
| 4,060,157 | A | * | 11/1977 | Hillstrom | 192/218  |
| 4,531,423 | A | * | 7/1985  | Fogelberg | 74/473.26|

(Continued)

OTHER PUBLICATIONS

International Search Report and Written Opinion (Both in English) for PCT/US2011/043802, mailed Oct. 10, 2011; ISA/EP.

*Primary Examiner* — William Kelleher
*Assistant Examiner* — Bobby Rushing, Jr.
(74) *Attorney, Agent, or Firm* — Dickinson Wright PLLC

(57) ABSTRACT

A sector plate assembly for a shift mechanism in an automotive vehicle includes a first sector plate being rotatable about an axis and including a peripheral edge having a camming surface. A second sector plate is rotatably coupled to the first sector plate for rotation about the axis. The second sector plate includes an accurately contoured slot. A biasing member is connected to the first and second sector plates to urge the sector plates toward a predetermined relative position.

13 Claims, 5 Drawing Sheets

(56) References Cited

U.S. PATENT DOCUMENTS

| | | | |
|---|---|---|---|
| 4,704,917 A * | 11/1987 | Hiroyasu | 74/473.1 |
| 4,739,670 A * | 4/1988 | Tomita et al. | 74/409 |
| 4,770,280 A * | 9/1988 | Frost | 192/53.343 |
| 5,713,243 A | 2/1998 | Williams et al. | |
| 5,725,453 A * | 3/1998 | Zalewski et al. | 475/204 |
| 6,220,109 B1 | 4/2001 | Fischer et al. | |
| 6,321,612 B1 | 11/2001 | Leimbach et al. | |
| 2008/0280728 A1 | 11/2008 | Chiba et al. | |
| 2009/0146650 A1* | 6/2009 | Hatanaka et al. | 324/207.25 |

\* cited by examiner

SHIFT SYSTEM FOR POWER TRANSFER UNIT HAVING DUAL SECTOR SHIFT ACTUATOR

CROSS-REFERENCE TO RELATED APPLICATIONS

This application is a National Stage of International Application No. PCT/US2011/043802, filed Jul. 13, 2011, and published in English as WO 2012/009401 A1 on Jan. 19, 2012. This application claims the benefit and priority of U.S. Application No. 61/364,114, filed Jul. 14, 2010. The entire disclosures of the above applications are incorporated herein by reference.

FIELD

The present disclosure relates to a shift system for a power transmission within an automotive vehicle and, more particularly, to a range shift system for a transfer case.

BACKGROUND

In general, power transfer mechanisms, such as transfer cases, may be operatively associated with either manual or automatic transmissions for selectively directing power from an engine to a first set of driven wheels in a two-wheel drive mode as well as selectively directing power to the non-driven wheels for operation in a four-wheel drive mode. Many transfer cases provide for a mode shift when transferring between two wheel and four wheel drive modes as well as a range shift to provide at least two different reduction ratios to the driven wheels.

Some transfer cases include a range shift system for axially translating a range sleeve between low range, neutral and high range positions. The range shift system also includes a range shift fork for the application of force to the range sleeve. The range shift fork is trapped between compression springs within a range bracket. To achieve a range shift, an actuator applies a force to the range bracket. The range bracket is translated causing a transfer of force through one of the springs to the range fork. If the teeth of the range sleeve and the driven components are aligned, axial translation of the range fork, the springs and the range bracket occurs. If the shift is blocked due to misalignment of the range sleeve teeth and the teeth of the associated driven component, the range bracket will continue to be translated to its desired position but the range fork will not translate and the spring will compress. Once the range clutch teeth align, the spring will drive the range fork and the range sleeve to the desired position.

On some occasions, the range shift system previously described suffers from certain deficiencies due to the high magnitude of torque transferred by the transfer case. In some instances, a main shaft containing the drive gears incurs a bending moment sufficient to affect the interface between the range gear set and the range sleeve teeth causing misalignment therebetween. The misalignment may place an axial load on a range sleeve pushing it against the range spring out of the drive gear and into neutral. While one remedy for this concern may be to increase the stiffness of the range spring to withstand the axial forces on the range sleeve and maintain the desired drive arrangement, the higher rate spring introduces other concerns. Specifically, the high rate spring resists compression by the range shift actuator such that the spring does not compress if a blocked shift occurs. In these instances, when a block occurs, the system will not successfully shift. The operator may be required to move the vehicle and attempt the range shift again.

Accordingly, it may be desirable to provide an improved range shift system that reduces the tendency to inadvertently shift into neutral while also allowing a range shift that does not require additional drive or input when a blocking condition exists.

SUMMARY

This section provides a general summary of the disclosure, and is not a comprehensive disclosure of its full scope or all of its features.

A sector plate assembly for a shift mechanism in an automotive vehicle includes a first sector plate being rotatable about an axis and including a peripheral edge having a camming surface. A second sector plate is rotatably coupled to the first sector plate for rotation about the axis. The second sector plate includes an arcuately contoured slot. A biasing member is connected to the first and second sector plates to urge the sector plates toward a predetermined relative position.

A shift system for a power transfer mechanism includes a first sector plate being rotatable between first and second positions. A second sector plate is rotatably coupled to the first sector plate and is moveable between first and second positions. The second sector plate is adapted to move a shifting member. A biasing member urges the first and second sector plates toward a mutually centered position. During a blocked shift, the first sector plate is rotated to the second position and the second sector plate is restricted from rotation. The biasing member urges the second sector plate toward the second position as long as the shifting member is blocked from movement.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
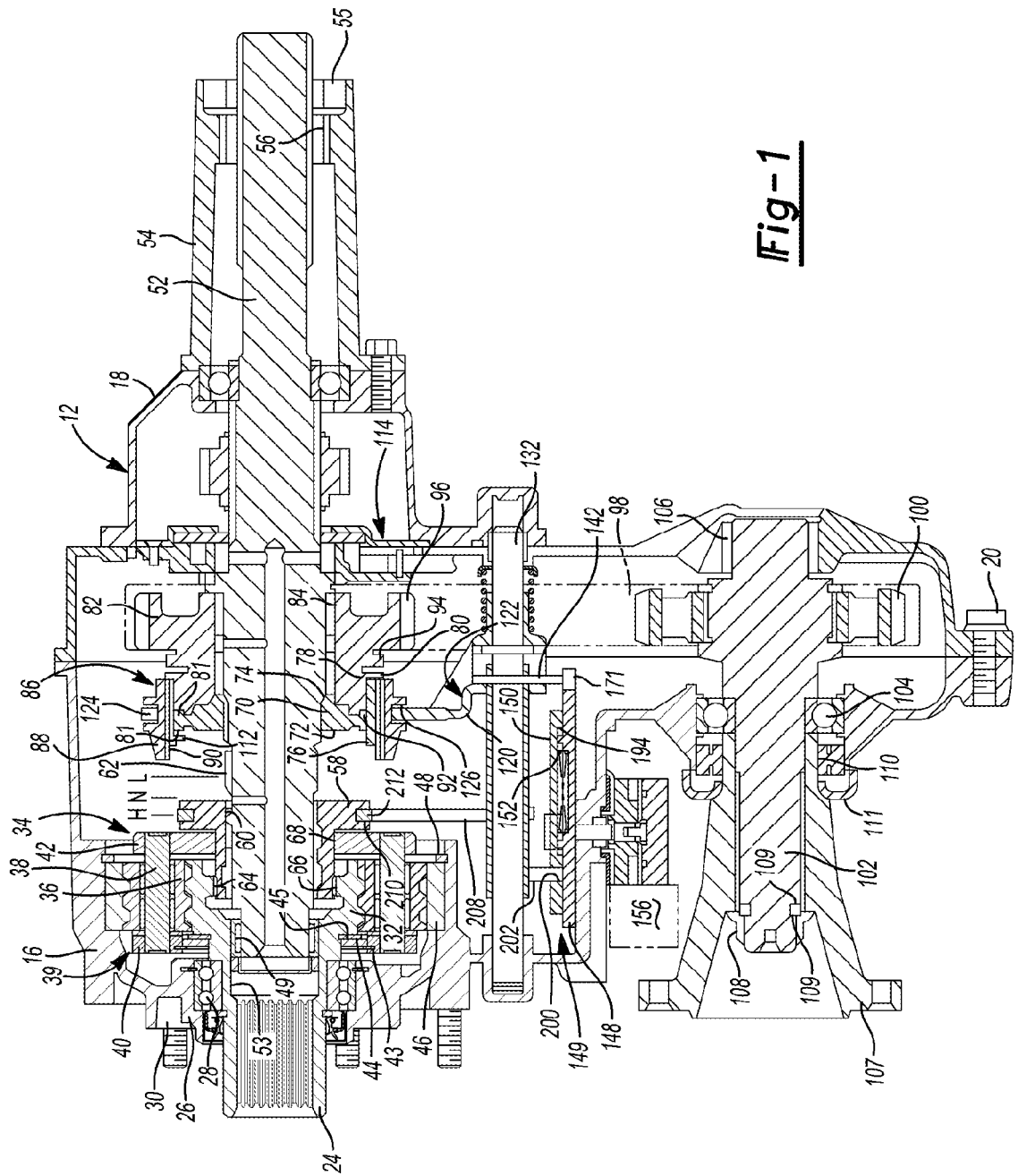
FIG. 1 is a cross-sectional view of an exemplary power transfer mechanism including a dual sector shift system.

Referring to FIG. 1, an exemplary transfer case 12 is shown which includes a housing assembly formed by front and back housing sections 16 and 18, respectively, fastened together by a plurality of threaded screws 20. Front housing section 16 receives a transmission output shaft (not shown) within an internally splined tubular input stub shaft 24. Input stub shaft 24, driven by an engine (not shown) of an automotive vehicle, is shown rotatably mounted in an input bearing retainer or collar portion 26 of front housing section 16 by an input bearing assembly 28 with collar portion 26 secured by screws 30 to front housing section 16.

Input shaft 24 is provided for transferring power to a planetary gear assembly or the like having a "high-range" direct drive position, a "low-range" position providing reduction ratio drive, and a "neutral" position for disengaging the torque transfer. One exemplary planetary gear assembly 34 is shown to include an input sun gear 32 integrally formed on input stub shaft 24. Sun gear 32 is shown meshed with a plurality of planet gears 36. Each planet gear 36 is rotatably journalled on a pinion shaft 38 supported in a planetary carrier 39. Six pinion shafts 38 and planet gears 36 are employed. Planetary carrier 39 includes fore and aft ring members 40 and 42, respectively, secured by staking of the pinion shafts. A carrier retainer ring 43, lock ring 44 and gear thrust washer 45 are also provided. Planet gears 36 mesh with a helical annulus gear 46 mounted via a splined press-fit to an inner surface of front housing section 16. Annulus gear 46 is additionally retained against rearward axial movement away from its stop shoulder by an annulus retainer ring 48 suitably fixed to front housing section 16. Needle bearings 49 are used throughout.

With continued reference to FIG. 1, transfer case 12 includes a first output in the form of a rear axle output or central shaft 52 which is aligned on the longitudinal axis of input shaft 24 and has a forward end journalled in an input shaft axial bore 53. The rearward end of central shaft 52 is adapted for connecting a rear prop shaft (not shown) for driving the rear axle of a motor vehicle. A housing extension 54 contains an oil seal 55 and a bushing 56 surrounding a section of central shaft 52 adjacent to its rearward end.

Central shaft 52 has a range collar or sleeve 58 axially slidable thereon by means of collar internal splines 60 engaged with external splines 62 on central shaft 52. Range collar 58 is formed with external spline teeth 64 shown slidably engaged with internal sun gear spline teeth 66 located in an axial counterbore in the right or aft end of input shaft 24. Torque or power flow is transferred directly from input shaft 24 to central shaft 52 through engagement of spline teeth 64 and 66 and the engagement of range collar internal splines 60 and central shaft external splines 62 for establishing the direct "high-range" position indicated by the construction line "H".

Carrier aft ring 42 includes internal spur gear teeth 68 formed concentric with range collar 58 which are placed in sliding meshed engagement with collar external spline teeth 64 upon range collar 58 being slid aft for defining the "low-range" position indicated by the construction line "L". In addition, when range collar 58 is moved rearwardly a predetermined distance from its high-range position, its external teeth 64 are disengaged from internal sun gear spline teeth 66 for providing the "neutral" drive range position indicated by construction line "N". Thus, in the neutral position no driving torque is transmitted to central shaft 52, whereby no power is supplied to the vehicle's rear wheels. However, it is to be understood that planetary gear assembly 34 is merely exemplary of the numerous speed reduction mechanisms suitable for use with the present invention.

A hub member 70 is fixedly splined to central shaft 52 by a snap ring 72 and a stop shoulder 74 formed thereon. Hub member 70 has an outer cylindrical hub portion 76 which generally encircles a blocker ring 78. Radially extending external teeth 80 are formed at an aft end of blocker ring 78. A pair of annular springs 81 is also provided. In addition, a chain carrier 82 is rotatably journalled by needle bearings 84 on central shaft 52. Chain carrier 82 can be selectively coupled for rotation to hub member 70 and, in turn, central shaft 52 by a synchronizer apparatus, generally indicated at 86.

Synchronizer apparatus 86 preferably depicted in the present embodiment is a conventional strut-type single-cone synchronizer clutch. It is to be understood, however, that virtually any other type of transmission synchronizer apparatus could be used without departing from the scope of the present invention. For example, another synchronizer apparatus suitable for use with the present invention is disclosed in U.S. Pat. No. 3,700,083 which issued on Oct. 29, 1972 to Ashikawa et al.; this is commonly referred to as "strutless" type synchronizer. Other torque couplings such as a multiplate friction clutch may be used to drivingly interconnect one member of chain carrier 82 to central shaft 52, in lieu of a synchronizer. Furthermore, chain carrier 82 could be in the form of other gear means, such as a speed gear member journally mounted in a transmission speed shaft or the like, without departing from the scope of the present invention.

An axially shiftable clutch sleeve 88 of synchronizer apparatus 86 is shown in a central disengaged two-wheel mode position. Clutch sleeve 88 is formed with internal spline teeth 90 which are in constant axial sliding engagement with external spline teeth 92 formed on cylindrical hub portion 76. Thus, clutch sleeve 88 may be axially shifted from the two-wheel drive mode position toward the four-wheel drive mode position to complete lock-up wherein internal spline teeth 90 drivingly engage external spline teeth 94 of chain carrier 82. Chain carrier 82 includes a drive sprocket 96 drivingly engaging a chain, shown in dashed lines at 98, which is coupled to a lower driven sprocket 100. Driven sprocket 100 is, in turn, coupled to a second output which is shown as a forwardly extending front axle output shaft 102. Front output shaft 102 is mounted for rotation within front housing section 16 by a ball bearing assembly 104 and in rear housing section 18 by a roller bearing assembly 106. Front output shaft 102 is suitably connected to a coupling flange 107 by a nut 108 and washers 109, as well as their mating splines, for driving the front wheels. Furthermore, an oil seal 110 and slinger 111 are provided.

Synchronizer apparatus 86 includes a thrust mechanism which is provided for moving blocker ring 78 toward chain carrier 82 upon rearward shifting movement of clutch sleeve 88. Moreover, in strut-type blocking synchronizer 86 the thrust mechanism comprises the pair of energizing circular retainer springs 81 that are compressed and inserted between a plurality of circumferentially spaced key-like struts, generally indicated at 112. Each of the three struts 112 are biased outwardly in their respective longitudinally extending slots formed in cylindrical hub portion 76. Struts 112 each have a raised central "bump" portion which engage a corresponding detent groove or recess formed in sleeve external spline teeth 92 with clutch sleeve 88 being disposed in its neutral position. Rearward movement of synchronizer blocker ring 78 results in frictional loading between a blocker ring inner conical surface and a mating chain carrier outer conical surface by outward thrusting of struts 112. The transfer case may also include an oil pump 114 and a tone wheel or electromagnetic speedometer enmeshed with shaft 52.

Figure 2:
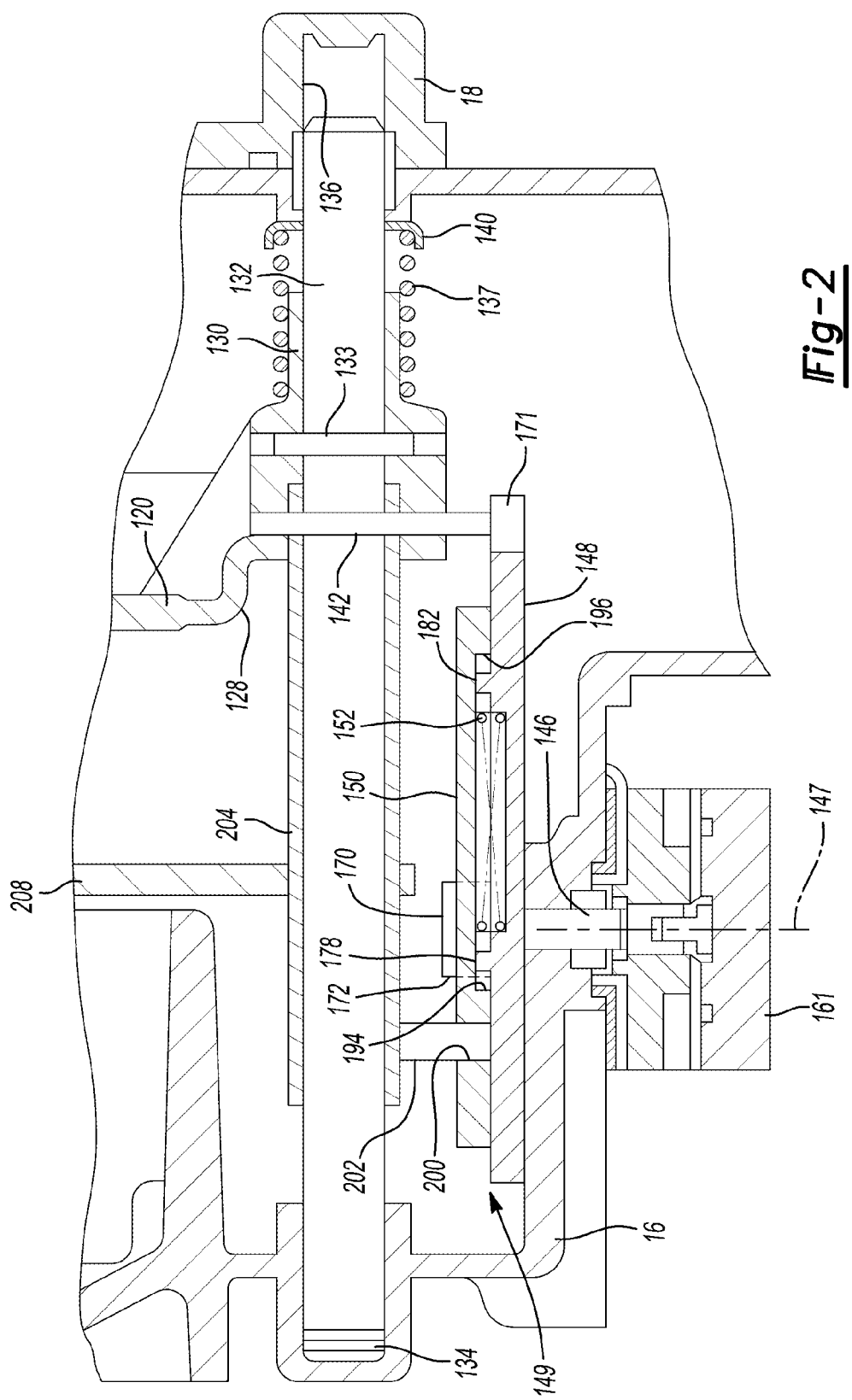
FIG. 2 is an enlarged fragmentary cross-sectional view similar to that of FIG. 1.
Figure 3:
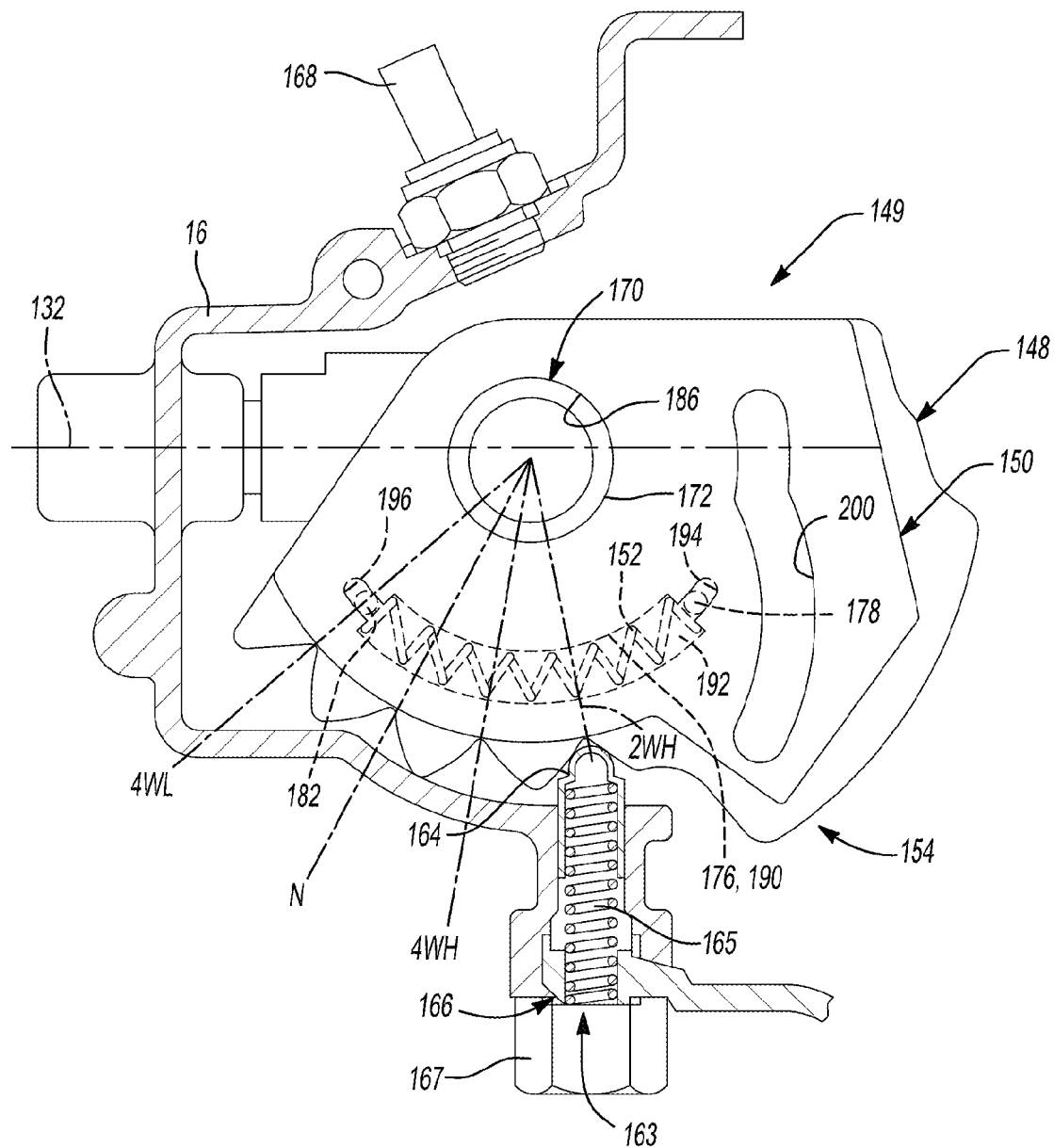
FIG. 3 is a side elevational view of a first sector plate of the dual sector shift system.
Figure 4:
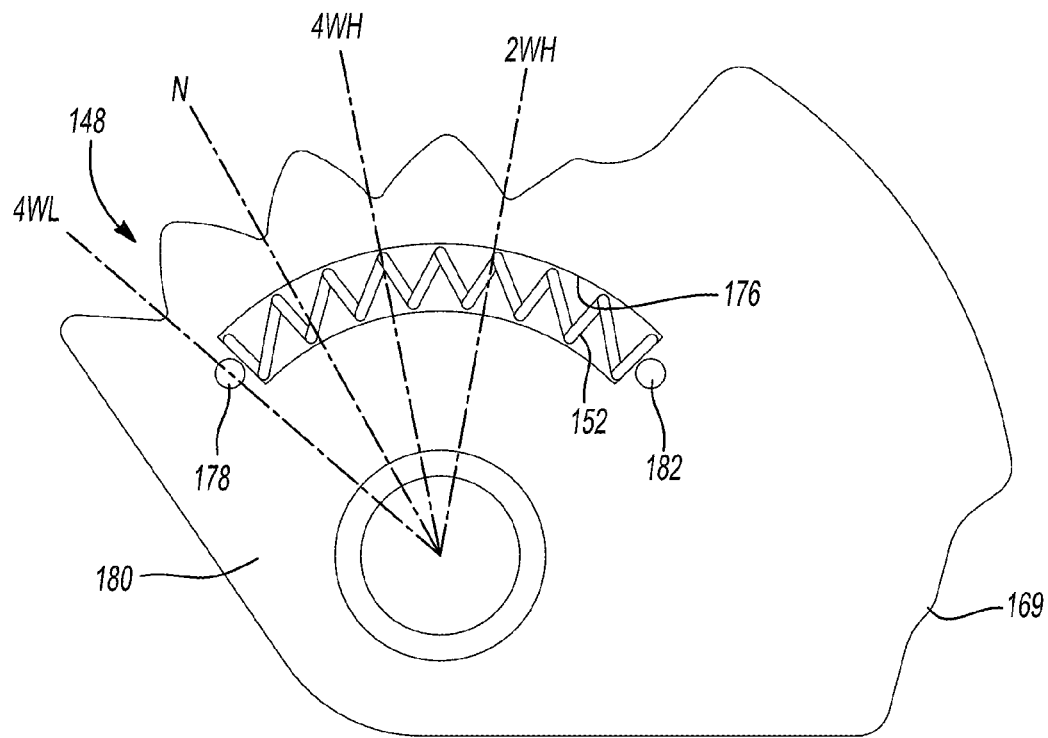
FIG. 4 is a perspective view of the first sector plate.
Figure 5:
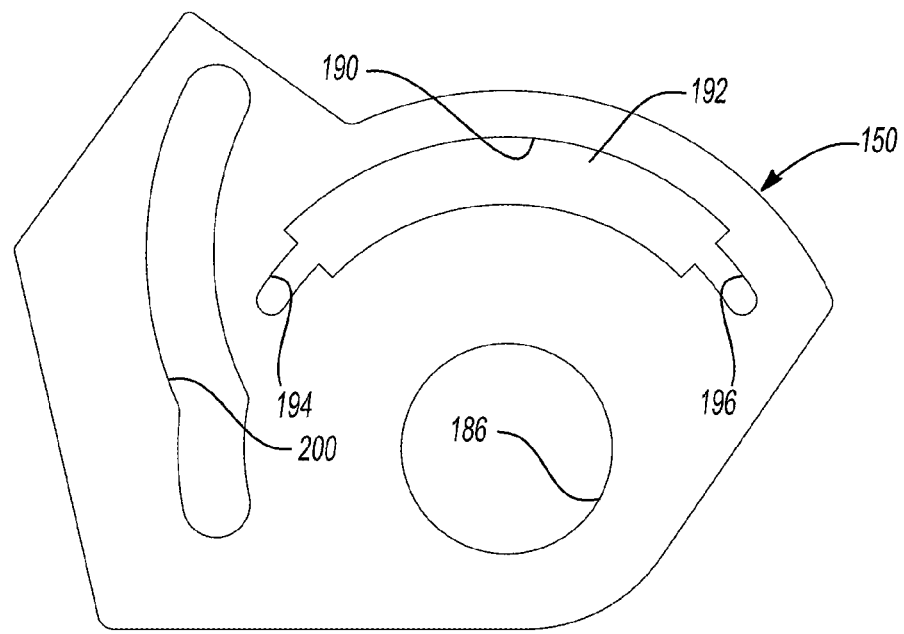
FIG. 5 is an elevational view of a second sector plate of the dual sector shift system.
Figure 6:
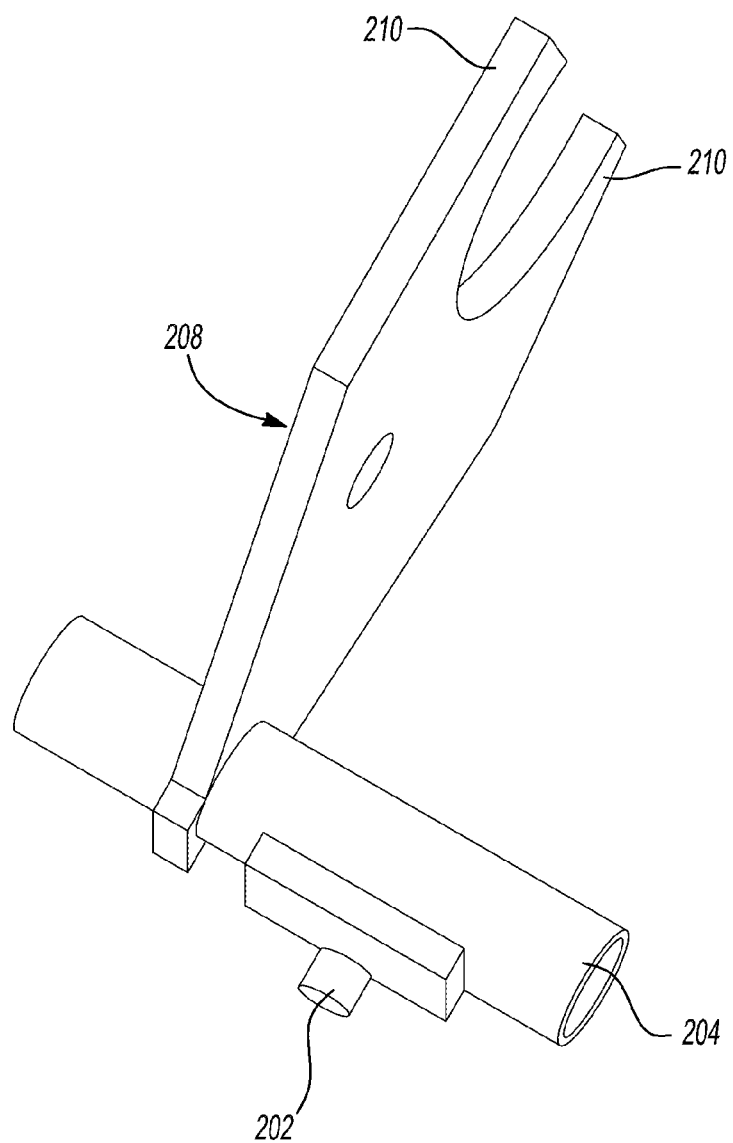
FIG. 6 is a perspective view of a range fork assembly.

As can be observed in FIGS. 1 and 2, a mode fork 120 of a shift fork assembly 122 has forked projections 124 engaged in an annular groove 126 formed in clutch sleeve 88. Mode fork 120 includes an arm 128 integrally formed with a longitudinally extending cylindrical tube member 130. A shift rail 132 is received within tube member 130 and coupled thereto by a pin 133. Opposite ends of shift rail 132 are suitably supported in fore and aft sockets 134 and 136, respectively, formed in housings 16 and 18. Tube member 130 is also fixed for limited axial movement with shift rail 132 by a mode pin 142. Moreover, mode fork 120 is normally biased toward the two-wheel drive mode position by spring 137 which is disposed between cup 140 and tube member 130.

A rotatable actuating shaft 146 is supported in the interior of transfer case housing 16 for rotation about its axis 147. A first end of actuating shaft 146 is fixed to a first sector plate 148. First sector plate 148 is part of a sector plate assembly 149 including a second sector plate 150 and a spring 152 biasedly engaging each of the first and second sector plates 148, 150. A motor sector gear 155, driven by a 12 volt DC electric motor 156, is suitably connected to an opposite end of actuating shaft 146 for rotating actuating shaft 146 and first sector plate 148 about axis 147 under the selective control of the vehicle operator. It will be understood that actuating shaft 146 can be alternately rotated in a manual manner by a shift lever and shifter assembly without departing from the fair scope of the present disclosure. An absolute encoder 161 is also preferably employed.

First sector plate 148 may be rotated by actuating shaft 146 to any of four selected operating positions indicated by the four distinct sector notches labeled "2WH", "4WH", "N" and "4WL" each successively engageable by a spring biased plunger assembly 163. It should be appreciated that the "N" notch is optional and not required within certain vehicle powertrain systems. Plunger assembly 163 includes a poppet plunger 164, a plunger spring 165, an O-ring seal 166 and a poppet screw 167. A four wheel drive indicator switch 168 is also mounted to housing 16.

A cam face 169 is also formed on a peripheral surface of first sector plate 148. A roller 171 is rotatably coupled to mode pin 142 and positioned in engagement with cam face 169. Rotation of first sector plate 148 selectively may cause translation of mode fork 120 based on the contour of cam face 169.

In addition, first sector plate 148 includes an axially extending boss 170 having a substantially cylindrically shaped outer surface 172. An arcuate recess 176 is formed within first sector plate 148 having a center of curvature coaxially aligned with a center of cylindrical surface 172. A first pin 178 protrudes from a surface 180 of first sector plate 148 at one end of recess 176. A second pin 182 is positioned at an opposite of recess 176 to similarly protrude from surface 180. Recess 176 is sized to receive approximately one-half of spring 152.

Second sector plate 150 includes a bore 186 configured in size and shape to closely match the size and shape of outer surface 172 of boss 170. Second sector plate 150 is rotatably supported on boss 170. Second sector plate 150 includes an arcuately shaped recess 190. Recess 190 includes a first portion 192 sized and shaped substantially similarly to recess 176. Portion 192 is in receipt of the other half of spring 152. A first slot extension portion 194 arcuately extends from one end of portion 192. In similar fashion, a second slot extension portion 196 arcuately extends from the opposite end of first portion 192. Slot extension portions 194, 196 have a reduced width such that spring 152 may not enter these portions. Slot extension portions 194, 196 are sized to receive first pin 178 and second pin 182. A maximum angle of relative rotation between first sector plate 148 and second sector plate 150 is defined by the relative positions of first pin 178, second pin 182 and the ends of slot extension portions 194, 196.

Second sector plate 150 also includes an elongated, multi-angled and contoured slot 200 formed therein into which a range pin 202 extends. Range pin 202 is fixed to a range tube 204. Range tube 204 is in slidable receipt of shift rail 132. A range fork 208 is fixed to range tube 204 and includes forked projections 210 slidably positioned within an annular groove 212 (see FIG. 1) of range collar 58.

When the vehicle operator desires to shift the transfer case from the two-wheel drive high-range (2WH) to the four-wheel drive high-range (4WH), electric motor 156 is selectively energized to cause rotation of actuating shaft 146 and first sector plate 148 through a predetermined angle for coupling chain carrier 82 to central shaft 52 via actuation of synchronizer apparatus 86. Range slot 200 is shaped such that range pin 202 maintains its current position during the shift from 2WH to 4WH.

To achieve four-wheel drive low-range (4WL) operation, electric motor 156 is energized to cause rotation of actuating shaft 146 and first sector plate 148 through another predetermined angle. Rotation of first sector plate 148 through this portion of travel maintains a driving interconnection between central shaft 52 and coupling chain carrier 82. The rotation of first sector plate 148 causes spring 152 to transfer a load to second sector plate 150. Second sector plate 150 rotates substantially simultaneously with first sector plate 148 during the transition from 4WH to a neutral position (N) where teeth 64 of range collar 58 are disengaged from internal sun gear spline teeth 66. A relatively low resistance to movement of range collar 58 is encountered when disengaging the previously mentioned spline teeth when entering the Neutral mode. As such, the force provided by spring 152 in its fully extended state is sufficient to drive second sector plate 150 substantially simultaneously with first sector plate 148.

During the next portion of the shift to 4WL, actuating shaft 146 continues to rotate first sector plate 148 in an attempt to drivingly engage external spline teeth 64 of range collar 58 with internal spur gear teeth 68 of carrier aft ring 42. If spur gear teeth 68 initially align with spline teeth 64, first sector plate 148 and second sector plate 150 will rotate substantially simultaneously because the force applied to second sector plate 150 by spring 152 is of sufficient magnitude to translate range collar 58 via range slot 200 and range pin 202. During some attempted shifts, however, spur gear teeth 68 will not be initially aligned with spline teeth 64. A blocking event will occur such that range collar 58 will be restricted from axially translating to its final position for provision of the 4WL mode of operation. During the blocking event, first sector plate 148 rotates relative to second sector plate 150. Second sector plate 150 is restricted from further rotation due to the blocking event and the direct interconnection between range fork 208, range pin 202 and second sector plate 150. Spring 152 compresses to allow first sector plate 148 to continue to rotate the predetermined angle under power from electric motor 156. Poppet plunger 164 will properly be seated within the associated notch on first sector plate 148. A position sensor that may be associated with the rotary location of first sector plate 148 will indicate that the 4WL position has been successfully reached.

Spring 152 will continue to bias second sector plate 150 in a direction urging range sleeve 58 toward the low-range position. Once spur gear teeth 68 align with spline teeth 64, range collar 58 will complete the axial translation toward the L position and place transfer case 12 in the 4WL mode of operation.

Once range sleeve 58 is located at the low range position, first sector plate 148 will become once again centered relative to second sector plate 150 based on the pocketed location of spring 152. At this time, range pin 202 is positioned directly in line with the axis of boss 170 thereby prohibiting range sleeve 58 from translation. The 4WL mode of operation will be maintained as long as the operator desires.

It should be appreciated that spring 152 is depicted as a typical cylindrically shaped coil spring when in the free state. Arcuate recess 176 and recess 190 maintain spring 152 in an arcuate shape. Other methods of allowing relative movement between first sector plate 148 and second sector plate 150 in conjunction with a biasing mechanism are within the scope of the present disclosure. For example, the arcuately positioned coil spring 152 may be replaced with a torsion spring or some other biasing mechanism urging first sector plate 148 and second sector plate 150 toward a mutually aligned position.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A shift system for a power transfer mechanism, comprising:
    a first sector plate being rotatable between first and second positions;
    a second sector plate being rotatably coupled to the first sector plate and moveable between first and second positions, the second sector plate being adapted to move a shifting member;
    a biasing member urging the first and second sector plates toward a mutually centered position, wherein during a blocked shift, the first sector plate is rotated to the second position and the second sector plate is restricted from rotation, the biasing member urging the second sector plate toward the second position as long as the shifting member is blocked from movement; and
    one of the sector plates defining at least one groove and the other of the sector plates presenting at least one pin protruding therefrom and received in the groove for sliding in the groove during the rotational movement of the first sector plate to limit the maximum relative rotation between the first and second sector plates.

2. The shift system of claim 1 wherein each of the first and second sector plates includes a recess in receipt of a portion of the biasing member and wherein each of the recesses have substantially the same cross-sectional shape as one another.

3. The shift system of claim 2 wherein each recess generally extends along a plane and is arcuately shaped and the biasing member includes a coil spring.

4. The shift system of claim 1 wherein the second sector plate includes a slot adapted to receive the shifting member.

5. The shift system of claim 4 wherein a portion of the shifting member positioned within the slot is aligned with an axis of rotation of the second sector plate when the second sector plate is at the second position.

6. The shift system of claim 4 wherein the first sector plate includes a cam surface adapted to drive another shifting member.

7. The shift system of claim 1 further including an actuator for rotating a shaft fixed to the first sector plate.

8. The shift system of claim 7 wherein the actuator includes an electric motor.

9. The shift system of claim 1 wherein the first sector plate includes an axially extending boss, the second sector plate including an aperture in rotatable receipt of the boss.

10. The shift system of claim 9 wherein the first sector plate includes a plurality of detents in receipt of a spring loaded retention mechanism, the angular position of the detents corresponding to different shift mechanism modes.

11. The sector plate assembly of claim 1 wherein the at least one groove includes a pair of grooves defined by the second sector plate with each of the grooves extending from opposing sides of the recess of the second sector plate, and the at least one pin includes a pair of pins protruding from the first sector plate with each of the pins received in one of the grooves to limit the maximum relative rotation between the first and second sector plates.

12. The sector plate assembly of claim 11 wherein the recess and the grooves of the second sector plate extend along a common radius.

13. The sector plate assembly of claim 11 wherein each of the grooves extend along a length and terminate at an end for allowing each of the pins to slide along the length of one of the grooves during relative rotation between the first and second sector plates and to limit rotation between the first and second sector plates when one of the pins engages the end of one of the grooves.

* * * * *